US012132264B2

(12) United States Patent
Le

(10) Patent No.: US 12,132,264 B2
(45) Date of Patent: Oct. 29, 2024

(54) INTEGRATED FILTER RADIATOR FOR A MULTIBAND ANTENNA

(71) Applicant: JOHN MEZZALINGUA ASSOCIATES, LLC, Liverpool, NY (US)

(72) Inventor: Kevin Le, Bel Air, MD (US)

(73) Assignee: John Mezzalingua Associates, LLC, Liverpool, NY (US)

(*) Notice: Subject to any disclaimer, the term of this patent is extended or adjusted under 35 U.S.C. 154(b) by 0 days.

(21) Appl. No.: 18/202,591

(22) Filed: May 26, 2023

(65) Prior Publication Data

US 2023/0387607 A1 Nov. 30, 2023

Related U.S. Application Data

(63) Continuation of application No. 17/508,116, filed on Oct. 22, 2021, now Pat. No. 11,664,607, which is a (Continued)

(51) Int. Cl.
*H01Q 21/26* (2006.01)
*H01Q 1/24* (2006.01)
(Continued)

(52) U.S. Cl.
CPC ............. *H01Q 21/26* (2013.01); *H01Q 1/246* (2013.01); *H01Q 1/38* (2013.01); *H01Q 1/521* (2013.01);
(Continued)

(58) Field of Classification Search
CPC .......... H01Q 21/26; H01Q 1/246; H01Q 1/38; H01Q 1/521; H01Q 9/28; H01Q 9/0414; H01Q 1/48; H01Q 1/243
See application file for complete search history.

(56) References Cited

U.S. PATENT DOCUMENTS 10,965,266 B1 3/2021 Xie et al.
11,145,994 B2 10/2021 Sundararajan et al.
(Continued)

FOREIGN PATENT DOCUMENTS

CN 101425626 A 5/2009
CN 106299686 A 1/2017
(Continued)

OTHER PUBLICATIONS

International Search Report and Written Opinion dated Feb. 1, 2019, from International Application No. PCT/US2018/054321, 14 pages.
(Continued)

*Primary Examiner* — Joseph J Lauture
(74) *Attorney, Agent, or Firm* — Meunier Carlin & Curfman LLC

(57) ABSTRACT

Disclosed is a low band dipole that has four dipole arms in a cross configuration, and a simplified cloaking structure to substantially prevent interference with radiated RF energy from nearby high band dipoles. Further disclosed is a feed network and dipole stem balun configuration that power divides and combines two distinct RF signals, without the use of a hybrid coupler, so that the four dipole arms collectively radiate the two RF signals respectively at a +45 degree and −45 degree polarization orientation relative to the orientation of the dipole arms.

5 Claims, 16 Drawing Sheets

Related U.S. Application Data continuation of application No. 16/753,377, filed as application No. PCT/US2018/054321 on Oct. 4, 2018, now Pat. No. 11,158,956.

(60) Provisional application No. 62/587,926, filed on Nov. 17, 2017, provisional application No. 62/567,809, filed on Oct. 4, 2017.

(51) Int. Cl.

| | |
|---|---|
| ***H01Q 1/38*** | (2006.01) |
| ***H01Q 1/52*** | (2006.01) |
| ***H01Q 9/28*** | (2006.01) |
| *H01Q 1/48* | (2006.01) |
| *H01Q 9/04* | (2006.01) |

(52) U.S. Cl.

CPC ............... *H01Q 9/28* (2013.01); *H01Q 1/243* (2013.01); *H01Q 1/48* (2013.01); *H01Q 9/0414* (2013.01)

(56) References Cited

U.S. PATENT DOCUMENTS

| | | | | |
|---|---|---|---|---|
| 11,158,956 | B2 * | 10/2021 | Le | H01Q 1/521 |
| 2002/0027531 | A1 | 3/2002 | Brown et al. | |
| 2005/0253769 | A1 | 11/2005 | Timofeev et al. | |
| 2010/0309084 | A1 | 12/2010 | Bu et al. | |
| 2011/0175779 | A1 | 7/2011 | Ju et al. | |
| 2015/0116174 | A1 | 4/2015 | Yona | |
| 2015/0263435 | A1 | 9/2015 | Song et al. | |
| 2016/0365641 | A1 | 12/2016 | Mayer et al. | |
| 2020/0059008 | A1 | 2/2020 | Zhao et al. | |
| 2021/0013631 | A1 * | 1/2021 | Jo | H01Q 1/48 |

FOREIGN PATENT DOCUMENTS

| | | |
|---|---|---|
| CN | 107112621 A | 8/2017 |
| CN | 105281031 | 2/2018 |
| EP | 3166178 | 5/2017 |
| EP | 3168927 | 5/2017 |
| KR | 10-1703741 | 2/2017 |

OTHER PUBLICATIONS

Mirhamed Mirmozafari et al., '"A Dual-Linear Polarized Highly Isolated Crossed Dipole Antenna for MPAR Application'", In: IEEE Antennas and Wireless Propagation Letters, Mar. 2017, pp. 1-4.
Supplementary Partial European Search Report dated May 26, 2021, issued in European Applicaton No. 18664145, 79 pages.
Office Action issued for Chinese Application No. 201880065023.7,dated Jan. 3, 2023.
Office Action issued for Chinese Application No. 201880065023.7, dated Mar. 28, 2022.

* cited by examiner

INTEGRATED FILTER RADIATOR FOR A MULTIBAND ANTENNA

BACKGROUND OF THE INVENTION

Field of the Invention

The present invention relates to antennas for wireless communications, and more particularly, to multiband antennas that have low band and high band dipoles located in close proximity.

Related Art

There is considerable demand for cellular antennas that can operate in multiple bands and at multiple orthogonal polarization states to make the most use of antenna diversity. A solution to this is to have an antenna that operates in two orthogonal polarization states in the low band (LB) (e.g., 496-690 MHz) and in two orthogonal polarization states in the high band (HB) (e.g., 1.7-3.3 GHz). There is further demand for the antenna to have minimal wind loading, which means that it must be as narrow as possible to present a minimal cross-sectional area to oncoming wind.

The need for a compact array face for an antenna that operates in both the low band and the high band presents challenges. Specifically, the more closely LB and HB dipoles are spaced on a single array face, the more they suffer from interference whereby transmission in either the HB and harmonics of the LB is respectively picked up by the dipoles of the other band, causing coupling and re-radiation that contaminates the gain pattern of the transmitting band.

This problem can be solved with dipoles that are designed to be "cloaked", whereby they radiate and receive in the band for which they are designed yet are transparent to the other band that is radiated by the other dipoles sharing the same compact array face. However, it can be costly to manufacture cloaked dipoles, which may require additional layers of components and rather complex structures.

FIGS. 1*a* and 1*b* illustrate an antenna array face 100 with a plurality of HB dipoles 110 and an LB dipole 120. As illustrated, both LB and HB dipoles may both operate in +/−45° polarizations, enabling two HB signals and two LB signals to operate simultaneously. As may be inferred from FIGS. 1*a* and 1*b*. LB dipole 120 may physically obstruct one or more HB dipoles 110, leading to cross-band contamination and degrading the HB gain pattern.

Further, there is also demand for cellular antennas that are capable of operating in circular polarization in the low band. This offers greatly improved performance, but generally requires completely different dipole hardware in order to implement it, making a full scale deployment of a circular polarized low band communication scheme cost prohibitive.

Accordingly, what is needed is a low band dipole configuration that minimizes physical interference and cross coupling with nearby high band dipoles, is capable of being operated simultaneously in +/−45° polarization states, is capable of being operated in a circular polarization mode without requiring hardware modifications, and is inexpensive and easy to manufacture.

SUMMARY OF THE INVENTION

Accordingly, the present invention is directed to an integrated filter radiator for multiband antenna that obviates one or more of the problems due to limitations and disadvantages of the related art.

An aspect of the present invention involves an antenna dipole that comprises a first dipole arm that extends from a dipole center in a positive direction along a first axis; a second dipole arm that extends from the dipole center in a negative direction along the first axis; a third dipole arm that extends from the dipole center in a positive direction along a second axis, wherein the second axis is orthogonal to the first axis; and a fourth dipole arm that extends from the dipole center in a negative direction along the second axis. The antenna further comprises a dipole stem on which the first, second, third, and fourth dipole arms are disposed. The dipole stem has a first dipole stein plate oriented along the first axis and a second dipole stem plate oriented along the second axis, the first and second dipole stem plates mechanically coupled in a cross arrangement having a center corresponding to the dipole center, the cross arrangement defining a first quadrant, a second quadrant, a third quadrant and a fourth quadrant. The antenna also has and a feedline network having a +45° feedline and a −45° feedline. The +45° feedline has a +45° feedline power divider, a first +45° trace coupled to the +45° feedline power divider, and second +45° trace coupled to the +45° feedline power divider, the second +45° trace corresponding to a 180° phase delay relative to the first +45° trace. The −45° feedline has a −45° feedline power divider, a first −45° trace coupled to the −45° feedline power divider, and second −45° trace coupled to the −45° feedline power divider, the second −45° trace corresponding to a 180° phase delay relative to the first −45° trace, wherein the first +45° trace is coupled to a first balun disposed on the first stem plate in the fourth quadrant, the second +45° trace is coupled to a second balun disposed on the first stem plate in the first quadrant, the first −45° trace is coupled to a third balun disposed on the second stem plate in the third quadrant, and the second −45° trace is coupled to a fourth balun disposed on the second stem plate in the second quadrant.

Another aspect of the present invention involves a dipole that comprises four dipole arms arranged in a cross configuration, and a dipole stem having a plurality of microstrip baluns and microstrip ground plates disposed thereon, wherein each of the microstrip ground plates is coupled to a corresponding dipole arm, wherein the microstrip baluns and microstrip ground plates are arranged such that each microstrip ground plate receives a directly coupled RF signal corresponding to one of a +45° polarization signal and a −45° polarization signal and a capacitively coupled RF signal corresponding to the other of the −45° polarization signal and the −45° polarization signal.

Yet another aspect of the present invention involves a dipole that comprises a PCB substrate, a first plurality of cloaking elements disposed on a first side of the PCB substrate; and a second plurality of cloaking elements disposed on a second side of the PCB substrate, wherein the first plurality of cloaking elements and the second plurality of cloaking elements are respectively formed from a single conductive layer respectively disposed on the first and second side of the PCB substrate. Further embodiments, features, and advantages of the integrated filter radiator for multiband antenna, as well as the structure and operation of the various embodiments of the integrated filter radiator for multiband antenna, are described in detail below with reference to the accompanying drawings.

It is to be understood that both the foregoing general description and the following detailed description are exemplary and explanatory only, and are not restrictive of the invention as claimed

BRIEF DESCRIPTION OF THE DRAWINGS

The accompanying drawings, which are incorporated in and constitute a part of this specification, illustrate embodiment(s) of the integrated filter radiator for multiband antenna described herein, and together with the description, serve to explain the principles of the invention.

DESCRIPTION OF EXEMPLARY EMBODIMENTS

Figure 1A:
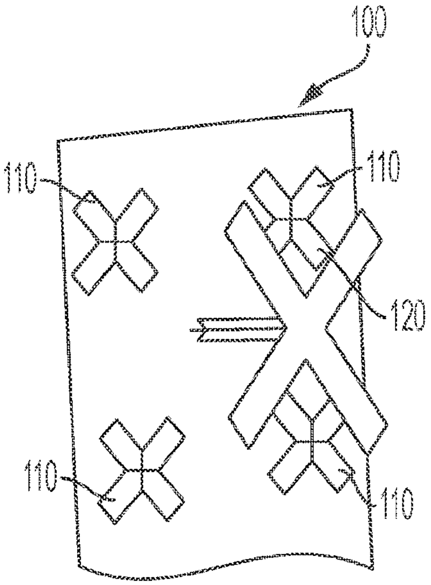
FIGS. 1*a* and 1*b* illustrate an antenna array face having diagonally oriented HB and LB dipoles for operation in +/−45° polarizations.
Figure 1B:
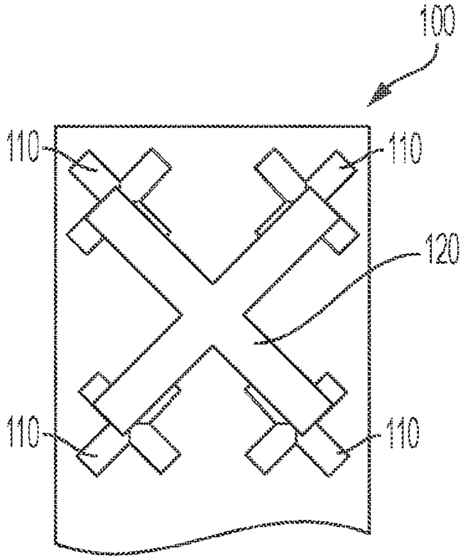
Figure 2A:
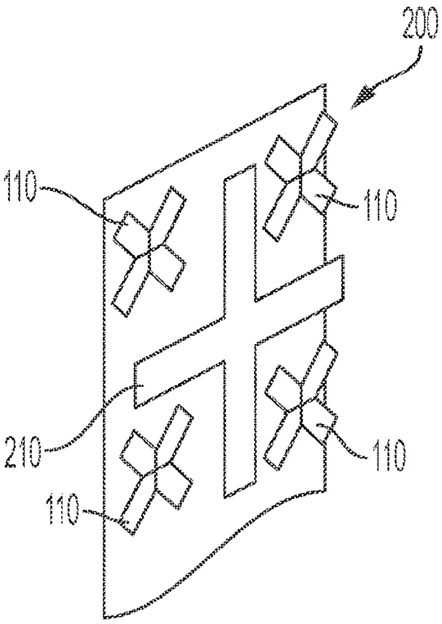
FIGS. 2*a* and 2*b* illustrate an exemplary antenna array face in which the LB dipole is oriented m a vertical and horizontal orientation yet operates in +/−45° polarizations.
Figure 2B:
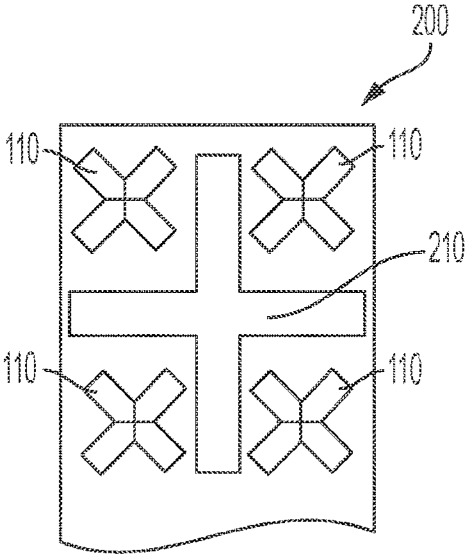

Reference will now be made in detail to embodiments of the integrated filter radiator for multiband antenna with reference to the accompanying figures FIGS. 2*a* and 2*b* illustrate an exemplary antenna array face in which the HB dipoles 110 are oriented diagonally, and the LB dipole 210 is oriented in a vertical and horizontal direction yet is configured top radiate and receive in +/−45° polarizations. As illustrated, having the LB dipole 210 oriented vertically and horizontally substantially mitigates the physical obstruction present in the antenna array face of FIGS. 1*a* and 1*b*. As is described below, LB dipole 210 has a vertically-oriented LB dipole and a horizontally-oriented dipole. The vertically-oriented dipole has a radiator component extending "upward" from center that is fed by an individual LB RF feed (not shown), and a counterpart radiator component extending "downward" from center that is fed by another LB RF feed (also not shown). Similarly, the horizontally-oriented LB dipole has a radiator component extending "leftward" from center that is fed by an individual LB RF feed (not shown), and a counterpart radiator component extending "rightward" from center that is fed by another LB RF feed (also not shown). These dipole structures are described in further detail in FIGS. 3*a* and 3*b*.

It will be understood that the terms "upward" and "downward" are used for convenience in reference to the drawings, and do not refer to the actual orientation of the LB dipole 210.

Figure 3A:
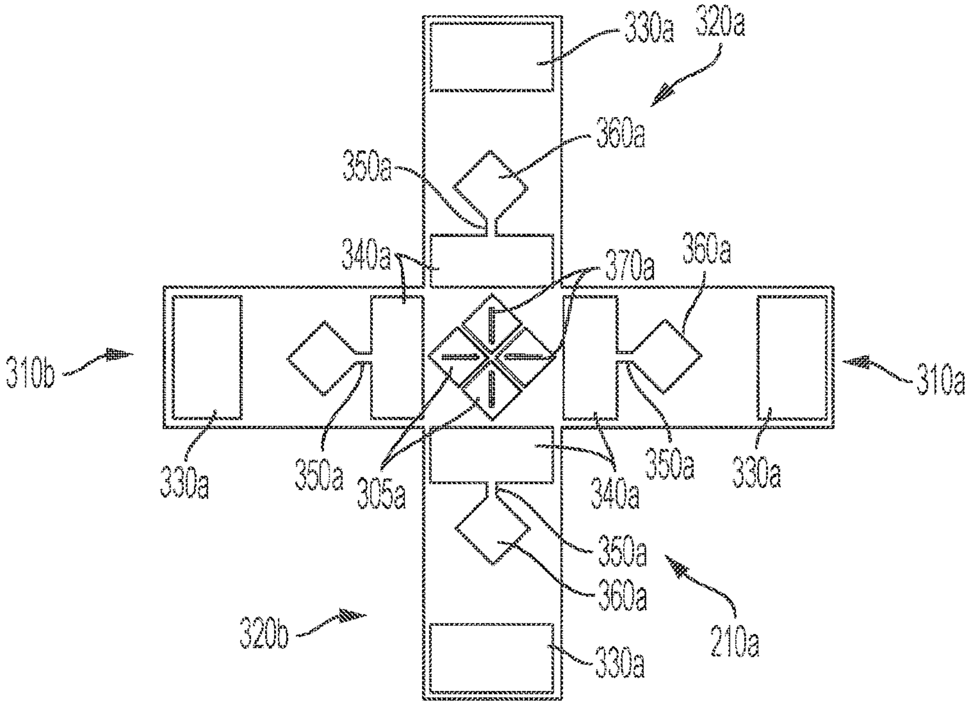
FIG. 3*a* illustrates a top or front surface of an exemplary LB dipole according to the disclosure.
Figure 3B:
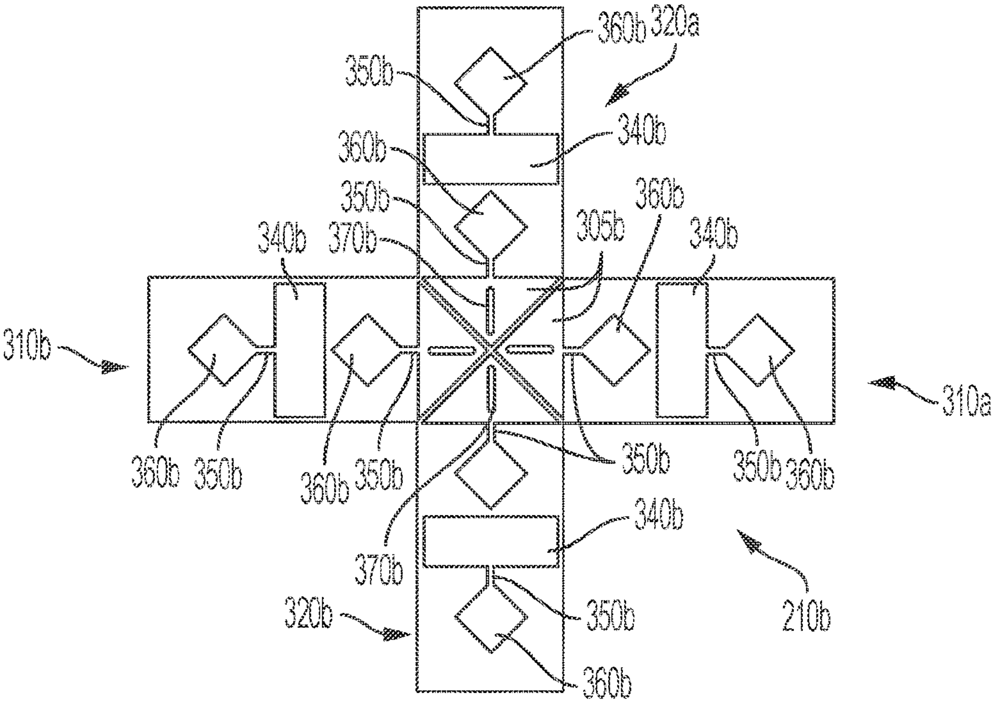
FIG. 3*b* illustrates a bottom or back surface of an exemplary LB dipole according to the disclosure.

FIGS. 3*a* and 3*b* respectively illustrate a front or "top" face 210*a* of LB dipole 210, and a back or "bottom" face 210*b* of LB dipole 210. Both figures illustrate a first horizontal dipole arm 310*a* that extends "rightward" from the dipole center, second horizontal dipole arm 310*b* that extends "leftward" from the dipole center, a first vertical dipole arm 320*a* that extends "upward" from the dipole center, and second vertical dipole arm 320*b* that extends "downward" from the dipole center. As illustrated, the shaded portions of front face 210*a* and back face 210*b* correspond to PCB substrate or an otherwise non-conducting surface, and the non-shaded portions correspond to metal conductor, such as copper.

Referring to FIG. 3*a*, at the center region of the cross shape of front dipole face 210*a* are four solder pads 305*a* to which corresponding microstrip ground plates (described later) are conductively coupled, and which are surrounded by non-conductive surface. Moving outward from center along each dipole arm, the next component in each dipole arm is a conductive element 340*a*, coupled to which is an "outward" facing inductor trace 350*a* to which is coupled a "diamond" shaped capacitive element 360*a*. Conductive element 340*a*, inductor trace 350*a*, and capacitive element 360*a* may be formed of a single piece of metal, such as copper. Located further "outward" is a distal conductive element 330*a*, which is separated from its corresponding diamond shaped capacitive element 360*a* by a gap. Exemplary dimensions are shown in FIG. 3*c*.

Referring to FIG. 3*b*, at the center region of the cross shape of back dipole face 210*b* are four "arrowhead" conductive elements 305*b*, each corresponding to an arm of the back dipole face 210*b*. Within each arrowhead conductive element 305*b* is a via 370*b*, through which microstrip ground plates (described later) pass without making conductive contact to arrowhead conductive element 305*b*. This may be accomplished whereby the conductive portion of the microstrip ground plate has disposed on it a solder mask, which prevents electrically conductive contact between microstrip ground plate and arrowhead conductive element 305*b*. Moving outward from center along each dipole arm, each arrowhead conductive element 305*a* is coupled to an inductor trace 350*b*, which is in turn coupled to a "diamond" shaped capacitive element 360*b*. Located further outward is conductive element 340*b*, which is separated from diamond shaped capacitive element 360*b* by a gap and which is coupled to further inductor trace 350*b*, to which is coupled a further diamond shaped capacitive element 360*b*.

Although capacitive element 360*a/b* has a "diamond" shape in this example, other shapes (e.g., rectangular, triangular, circular, etc.) are possible and within the scope of the disclosure, as long as the volume of the capacitive element is the same.

Figure 3C:
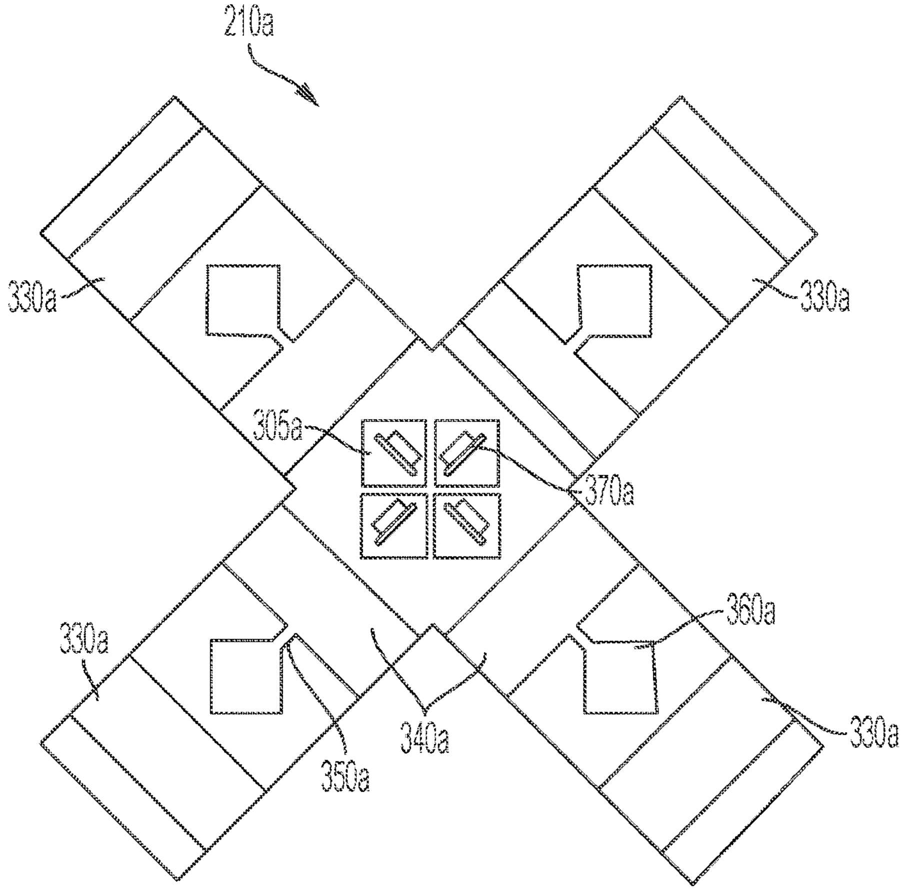
FIG. 3*c* illustrates the top or front surface of the LB dipole, showing exemplary dimensions.
Figure 3D:
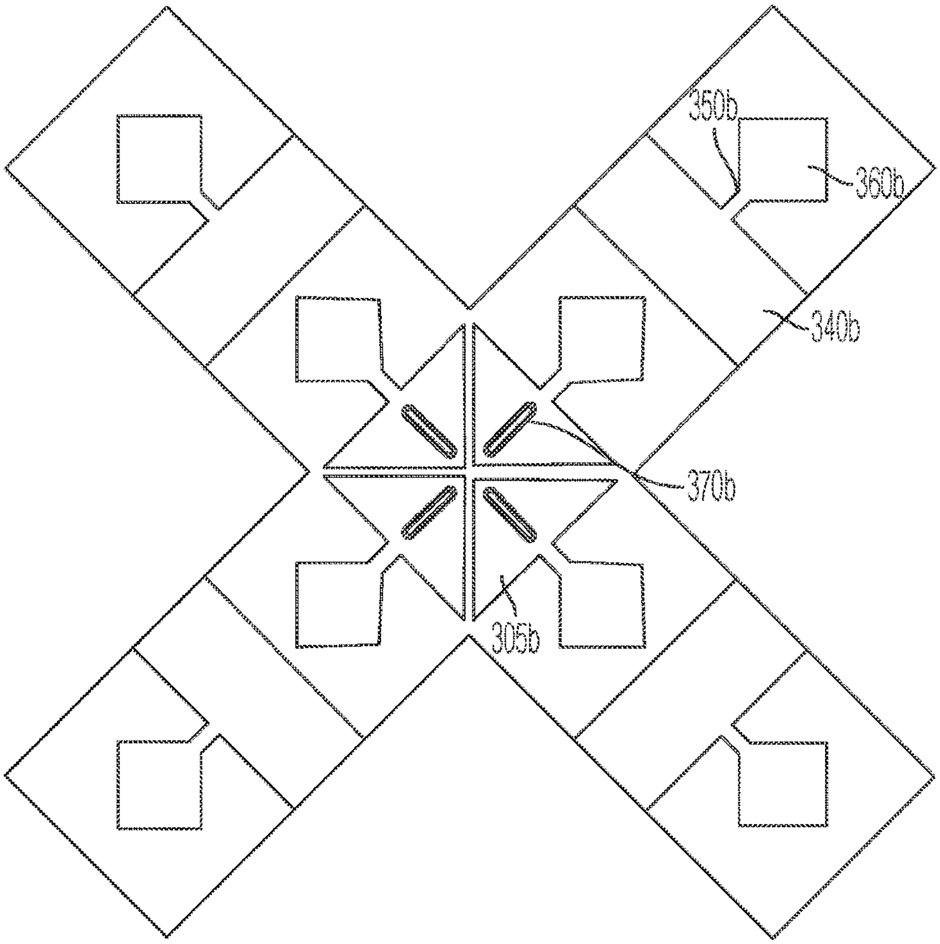
FIG. 3*d* illustrates the bottom or back surface of the LB dipole, showing exemplars dimensions.

FIGS. 3*c* and 3*d* respectively illustrate front face 210*a* and back face 210*b* of LB dipole 210, including exemplary dimensions. It will be readily understood that these dimensions are examples, and that varying dimensions are possible and within the scope of the disclosure.

Figure 4:
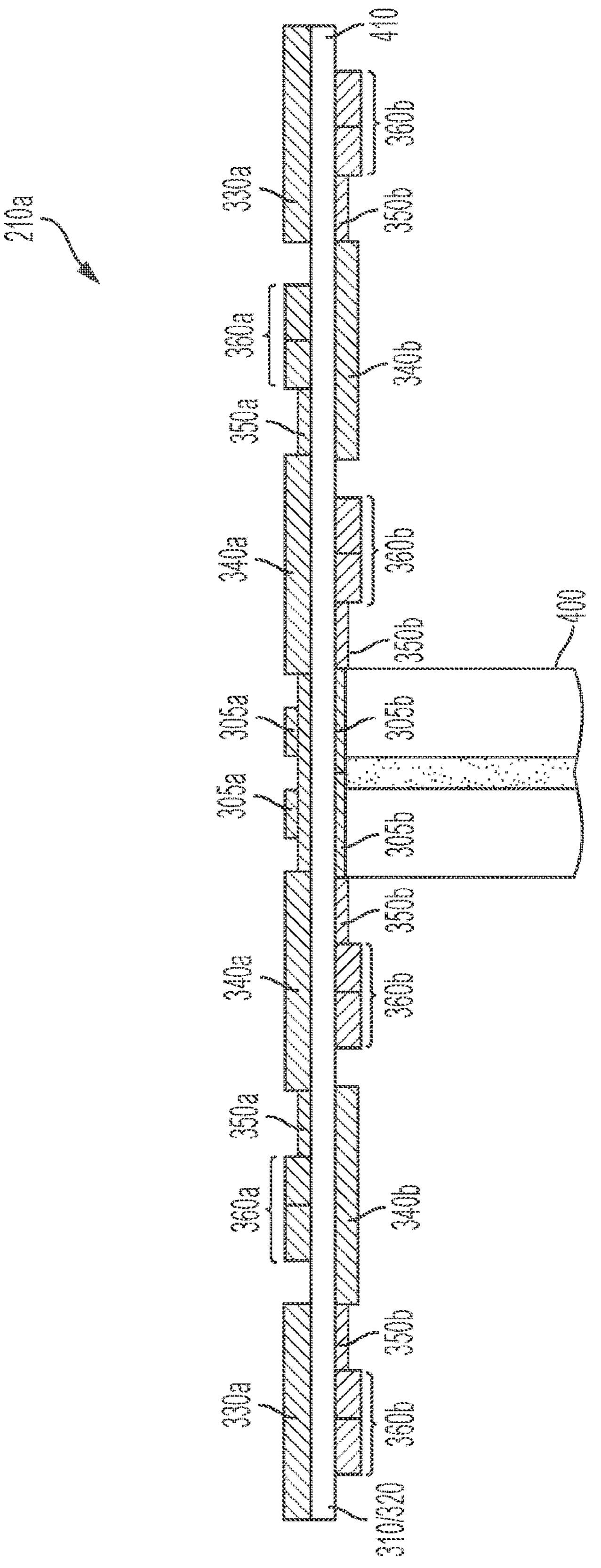
FIG. 4 illustrates a side view of an exemplary LB dipole according to the disclosure, revealing the arrangement of conductive elements on the top and bottom surfaces of a PCB substrate.

FIG. 4 illustrates a side view of an exemplary LB dipole 210 according to the disclosure, revealing the arrangement of conductive elements on the top and bottom surfaces (respectively, front face 210*a* and back face 210*b*). LB dipole 210 includes a PCB substrate 410, and a conductive surface on the top and bottom that may be etched to form the components of front face 210*a* and back face 210*b*. As illustrated, dipole stem 400 engages LB dipole 210 by mechanically coupling directly to back face 210*b*, and microstrip ground plates (described later) electrically and mechanically couple to front face 210*a* by being passed through via 370*b* (of back face 210*b*) and soldered to solder pad 305*a* (of front face 210*a*). Further illustrated in FIG. 4 are the alternating combinations of conductive elements 340*a* and 330*a* (on front face 210*a*) in back-to-back configurations with corresponding diamond shaped capacitive elements 360*b* (on back face 210*b*), as well as conductive elements 340*b* (on back face 210*b*) in a back-to-back configuration with diamond shaped capacitive element 360*a* (on front face 210*a*). Accordingly, a plurality of capacitors are formed. A first capacitor is formed of conductive element 340*a* and its corresponding capacitive element 360*b*, with the PCB substrate 410 serving as the dielectric; a second capacitor is formed of conductive element 340*b* and its corresponding capacitive element 360*a*, with the PCB substrate 410 serving as its dielectric; and a third capacitor is formed of conductive element 330*a* and its corresponding capacitive element 360*b*, with the PCB substrate 410 serving as its dielectric. Accordingly, each dipole arm assembly 310*a/b* and 320*a/b* comprises a succession of capacitors and inductors, providing a cloaking function whereby RF energy radiated by the HB dipoles are effectively transparent to the LB dipole, and induced currents are suppressed, thus mitigating interference between the HB and LB dipoles.

Exemplary materials for the LB dipole 210 may include the following. Substrate 410 may be a standard PCB material, such as 0.0203" Rogers 4730JXR, and the conductive material disposed on the top and bottom surfaces of substrate 410 (which may be etched to form the illustrated components) may by 1 oz. copper. It will be understood that variations to these materials are possible and within the scope of the disclosure.

The structure of LB dipole 210 offers an advantage in that it comprises a single PCB substrate on which a conductive layer is disposed. The conductive layer on the front and back faces of the dipole may be etched to form the structure disclosed. Accordingly, the structure of LB dipole 210 is extremely simple and inexpensive to manufacture, unlike other cloaked dipole configurations.

Figure 5:
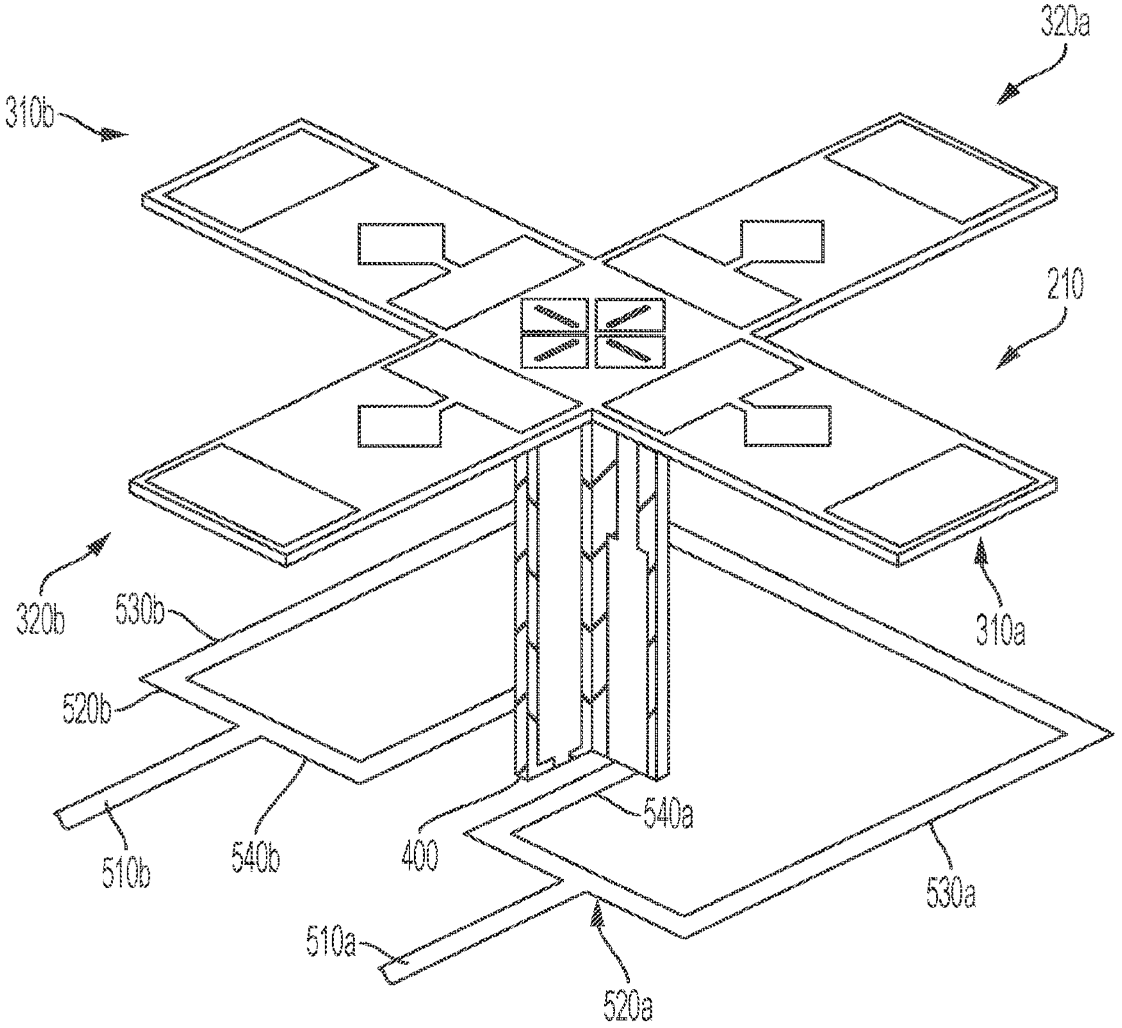
FIG. 5 illustrates an exemplary LB dipole according to the disclosure, including its dipole stem and portions of the feedline network.

FIG. 5 illustrates exemplary LB dipole 210, mounted on dipole stem 400, and a portion of the feed network disposed on a feedboard to which the dipole stem 400 is mounted. The feed network includes RF feedlines corresponding to the +45° signal and the −45° signal. Illustrated is +45° feedline 510*a*, which includes a power divider 520*a*, and two traces coupled to the power divider 520*a*: first −45° trace 540*a*, and second −45° trace 530*a*. First +45° trace 540*a* couples directly to a microstrip balun that feeds corresponding dipole arm 310*a*. Second +45° trace 530*a* takes a longer path to couple with a microstrip balun such that the RF signal that reaches the other microstrip balun is 180° out of phase with the signal on trace 540*a* where it couples with its corresponding microstrip balun. Further illustrated is −45° feedline 510*b*, which includes a power divider 520*b* and two traces coupled to power divider 520*b*: first −45° trace 540*b* and second −45° trace 530*b*.

Figure 6A:
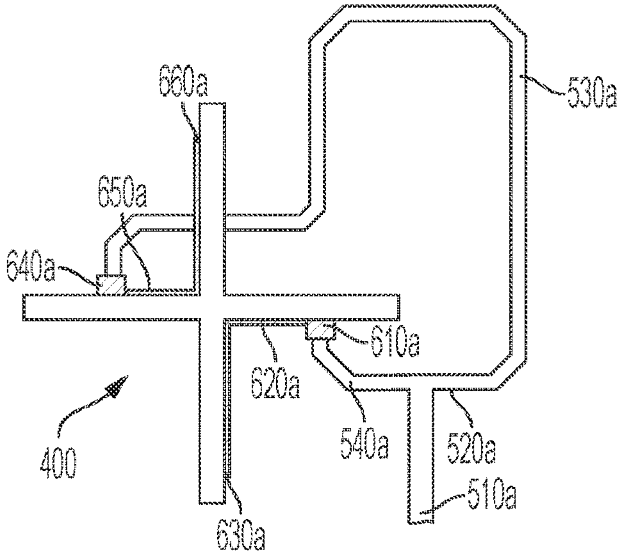
FIG. 6*a* illustrates the LB dipole stein from a "top-down" perspective, along with the balun circuit and relevant feedlines for an exemplary +45° polarization LB dipole component.

FIG. 6*a* illustrates the LB dipole stem 400 from a “top-down” perspective, along with the balun circuit and relevant feedlines for an exemplary −45° polarization LB dipole signal. This perspective is looking “down” on the dipole stem 400 with the LB dipole 210 removed, such that the dipole stem 400 would be coming out perpendicularly out of the page. Illustrated are +45° signal feedline 510*a*, power divider 520*a*, and first trace 540*a*. First trace 540*a* couples directly to microstrip balun 620*a* at connection point 610*a*, whereby microstrip balun 620*a* is electrically coupled to corresponding microstrip ground plate 630*a*, which is disposed on the proximal surface of the stem plate orthogonal to the stem plate on which microstrip balun 620*a* is disposed as it traces from connection point 610*a*. Second trace 530*a* proceeds from power divider 520*a* and meanders before electrically coupling to opposite microstrip balun 650*a* via connection point 640*a* such that the signal arriving at connection 640*a* has a 180° phase delay relating to the signal arriving at connection point 610*a*. Microstrip balun 650*a* further couples to opposite microstrip ground plate 660*a*, which is disposed on the dipole stem plate orthogonal to the dipole stem plate on which connection point 640*a* is disposed.

Figure 6B:
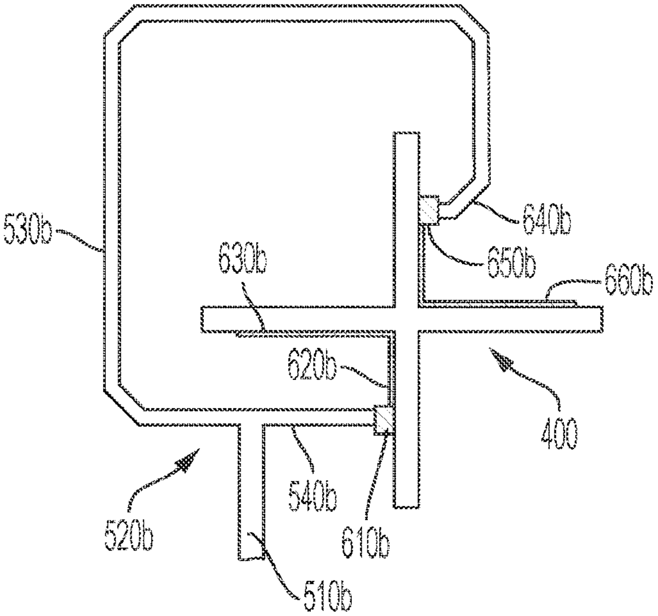
FIG. 6*b* illustrates the LB dipole stem from a "top-down" perspective, along with the balun circuit and relevant feedlines for an exemplary −45° polarization LB dipole component.

FIG. 6*b* illustrates the LB dipole stem 400 at the same orientation as in FIG. 6*a*. However, FIG. 6*b* illustrates the feedline and balun circuitry for the −45° polarization LB dipole signal. Illustrated are −45° signal feedline 510*b*, power divider 520*b*, and first trace 540*b*. First trace 540*b* couples directly to microstrip balun 620*b* at connection point 610*b*, whereby microstrip balun 620*b* electrically couples to corresponding microstrip ground plate 630*b*, which is disposed on a stem plate orthogonal to the stem plate on which microstrip balun is disposed as it traces from connection point 610*b*. Second trace 530*b* proceeds from power divider 520*b* and meanders before electrically coupling to opposite microstrip balun 650*b* via connection point 640*b* such that the signal arriving at connection 640*b* has a 180° phase delay relating to the signal arriving at connection point 610*b*. Microstrip balun 650*b* further couples to opposite microstrip ground plate 660*b*, which is disposed on the dipole stem plate orthogonal to the dipole stem plate on which connection point 640*b* is disposed.

Referring back to FIG. 5, it will be apparent that the microstrip baluns 620*a*, 650*a*. 620*b*, and 650*b* substantially span the distance from respective connection points 610*a*, 640*a*. 610*b* and 640*b* upward to near the base of dipole arms 310*a/b* and 320*a/b*. Further, microstrip ground plates 630*a*. 660*a*. 630*b*, and 660*b* are each electrically coupled to a ground plane (not shown) in the multilayer PCB board to which dipole stem 400 is affixed.

Figure 6C:
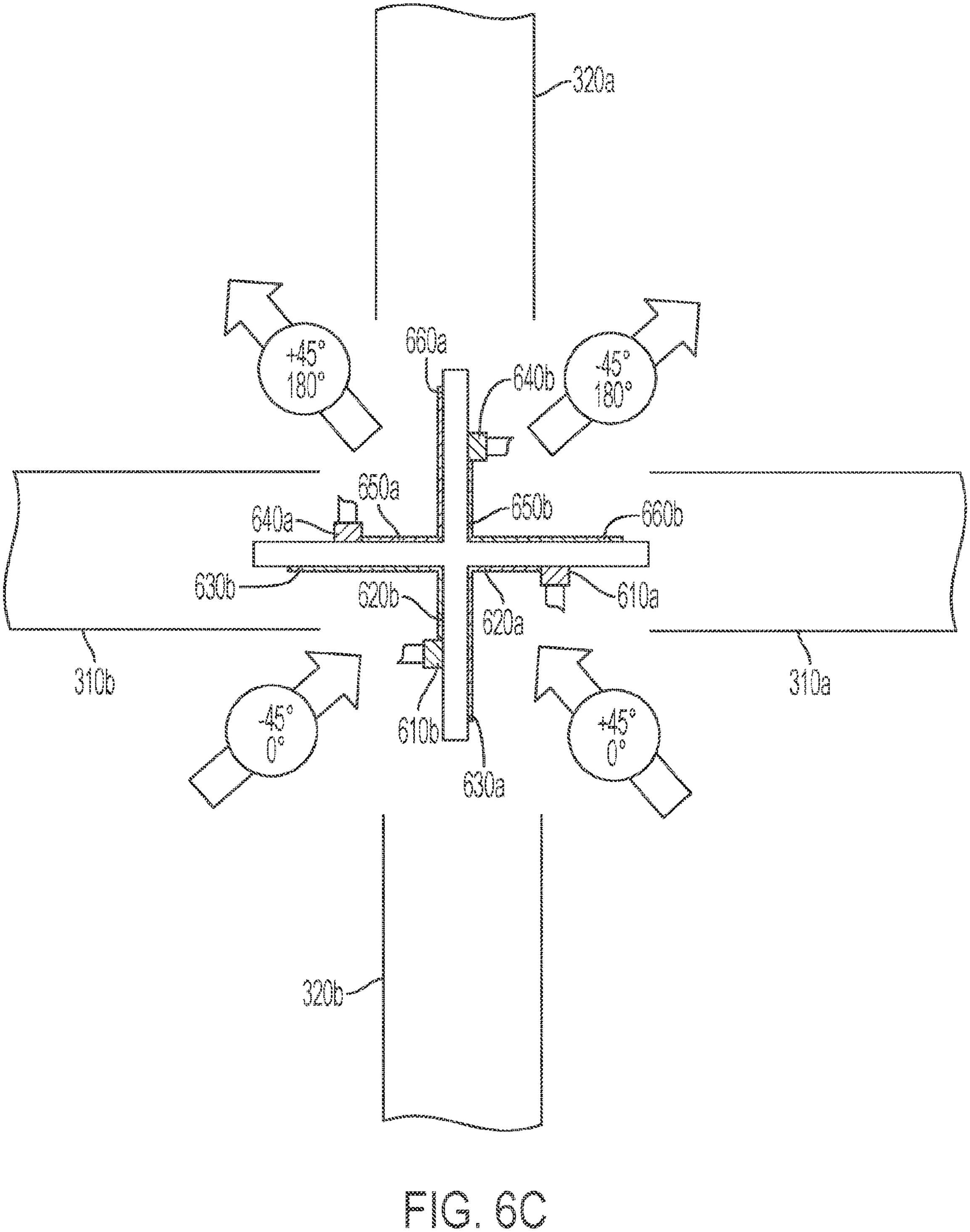
FIG. 6*c* illustrates the LB dipole stem, similarly to FIGS. 6*a* and 6*b*, with the balun circuitry for both −45° and −45° polarizations present on the dipole stem.

FIG. 6*c* illustrates the LB dipole stem, similarly to FIGS. 6*a* and 6*b*, with the balun circuitry for both +45° and −45° polarizations illustrated on the dipole stem. But first, some background.

It is known that two dipoles arms, oriented horizontally and vertically, with each dipole arm having a single RF feed, can be configured to radiate at +/−45 degree polarization orientations, through the use of hybrid couplers. There are several considerable drawbacks to this approach. First, each hybrid coupler incurs a 3 dB loss on each signal. Second, the hybrid coupler has limited isolation, which degrades the performance of the dipole in radiating two distinct RF signals at different polarizations. The structure according to the disclosure does not suffer these disadvantages.

Referring to FIG. 6*c*, illustrated are the four microstrip baluns, each corresponding to a polarization and a phase delay: 620*a* (+45°/0°); 650*a* (+45°/180°); 620*b* (−45°/0°), and 650*b* (−45°/180°); and the four microstrip ground plates: 630*a* (+45°/0°), directly coupled to microstrip balun 620*a*); 660*a* (+45°/180°, directly coupled to microstrip balun 650*a*); 630*b* (−45°/0°, directly coupled to microstrip balun 620*b*); and 660*b* (−45°/180°, directly coupled to microstrip balun 650*b*). The microstrip baluns are respectively coupled to their corresponding microstrip ground plates by making a 90° bend from the stem plate surface on which the microstrip balun is disposed to the proximal surface of the orthogonal stem plate.

Referring to FIGS. 6*c* and 3*a*, and 3*b*, microstrip ground plate 660*b* is coupled to dipole arm 310*a* as follows. Dipole stem 400 as four tabs (not shown) that pass through vias 570*b* (FIG. 3*b*). Microstrip ground plate 660*b*, as it is disposed on dipole stem plate 400, has a conductive tab that extends through its corresponding via 370*b* where it is electrically coupled (e.g., soldered) to its corresponding solder pad 305*a* on dipole arm 310*a*. Similarly, microstrip ground plate 630*b* is coupled to dipole arm 310*b* through a similar arrangement. Further, microstrip ground plate 660*a* is coupled to dipole arm 320*a*, and microstrip ground plate 630*b* is coupled to dipole arm 320*b* by corresponding arrangements.

Another way to visualize FIG. 6*c* is to divide the configuration into quadrants, whereby the top left (first) quadrant includes microstrip balun 650*a* and microstrip ground plate 660*a*; the top right (second) quadrant includes microstrip balun 650*b* and microstrip ground plate 660*b*: the bottom left (third) quadrant includes microstrip balun 620*b* and microstrip ground plate 630*b*; and the bottom right (fourth) quadrant includes microstrip balun 620*a* and microstrip ground plate 630*a*.

The configuration of microstrip baluns and microstrip ground plates is as follows. Each microstrip ground plate conducts two independent currents. One current is directly sourced from the microstrip balun to which it is directly coupled, and the other is capacitively coupled from the microstrip balun disposed on the opposite side of the stem plate on which the microstrip ground plate is disposed.

For example, referring to FIG. 6*c*, for the +45° polarization and 0° phase signal, the signal couples from connection point 610*a* to microstrip balun 620*a* The current on microstrip balun 620*a* capacitively couples to microstrip ground plate 660*b*, through which the resulting current couples to dipole arm 310*a*. Additionally, the current in microstrip balun 620*a* flows directly to microstrip ground plate 630*a*, through which it couples to dipole arm 320*b*. Given the tuning of the balun circuitry between microstrip balun 620*a*, and microstrip ground plates 660*b* and 630*a*, a substantially equal current is respectively induced in dipole arms 310*a* and 320*b*. This results in a radiated waveform with its polarization vector oriented at +45°, with the rightward and downward signals respectively serving as vector components of the +45° polarization vector.

A similar process occurs for the −45° signal with 180° phase delay. In this case, the phase delayed signal couples from connection point 640*a* to microstrip balun 650*a*. The current on microstrip balun 650*a* capacitively couples to microstrip ground plate 630*b*, through which the resulting current couples to dipole arm 310*b*. Additionally, the current in microstrip balun 650*a* flows directly to microstrip ground plate 660*a*, through which it couples to dipole arm 320*a*. Given the tuning of the balun circuitry between microstrip balun 640*a*, and microstrip ground plates 630*b* and 660*a*, a substantially equal current is respectively induced in dipole arms 310*b* and 320*a*. This results in a radiated waveform with its polarization vector oriented at +45, with the leftward and upward signals respectively serving as vector components of the +45° polarization vector.

The two +45° polarization signals, being 180° out of phase from each other, given the configuration of the baluns and the dipoles, results in a constructive interference of the two emitted RF waveforms, doubling the amplitude of the radiated energy of just one of the +45° signal components.

The mode of operation is similar for the −45° signals. Referring to FIG. 6*c*, for the −45° polarization and 0° phase signal, the signal couples from connection point 610*b* to microstrip balun 620*b*. The current on microstrip balun 624*b* capacitively couples to microstrip ground plate 630*a*, through which the resulting current couples to dipole arm 320*b*. Additionally, the current in microstrip balun 620*b* flows directly to microstrip ground plate 630*b*, through which it couples to dipole arm 310*b*. Given the tuning of the balun circuitry between microstrip balun 620*b*, and microstrip ground plates 630*a* and 630*b*, a substantially equal current is respectively induced in dipole arms 310*b* and 320*b*. This results in a radiated waveform with its polarization vector oriented at −45°, with the leftward and downward signals respectively serving as vector components of the −45° polarization vector.

A similar process occurs for the −45° signal with 180° phase delay. In this case, the phase delayed signal couples from connection point 640*b* to microstrip balun 650*b*. The current on microstrip balun 650*b* capacitively couples to microstrip ground plate 660*a*, through which the resulting current couples to dipole arm 320*a*. Additionally, the current in microstrip balun 650*b* flows directly to microstrip ground plate 660*b*, through which it couples to dipole arm 310*a*. Given the tuning of the balun circuitry between microstrip balun 640*b*, and microstrip ground plates 660*a* and 660*b*, a substantially equal current is respectively induced in dipole arms 310*a* and 320*a*. This results in a radiated waveform with its polarization vector oriented at −45°, with the rightward and upward signals respectively serving as vector components of the −45° polarization vector.

The two −45° polarization signals, being 180° out of phase from each other, given the configuration of the baluns and the dipoles, results in a constructive interference of the two emitted RF waveforms, doubling the amplitude of the radiated energy of just one of the −45° signal components.

Accordingly, instead of relying on hybrid couplers for splitting and combining the two RF signals, the feed network and balun configuration of the present disclosure splits and recombines the appropriate signals by superimposing two signals into each microstrip capacitor plate and thus to each arm of the LB dipole, creating orthogonal vertical and horizontal polarization vector components for each of the RF signals, thereby generating +/−45° polarization signals using vertical and horizontal dipoles. In doing so, it eliminates the need for hybrid coupler hardware within the antenna housing, and further eliminates the 3 dB loss and signal isolation problems symptomatic of the use of hybrid couplers.

Figure 7A:
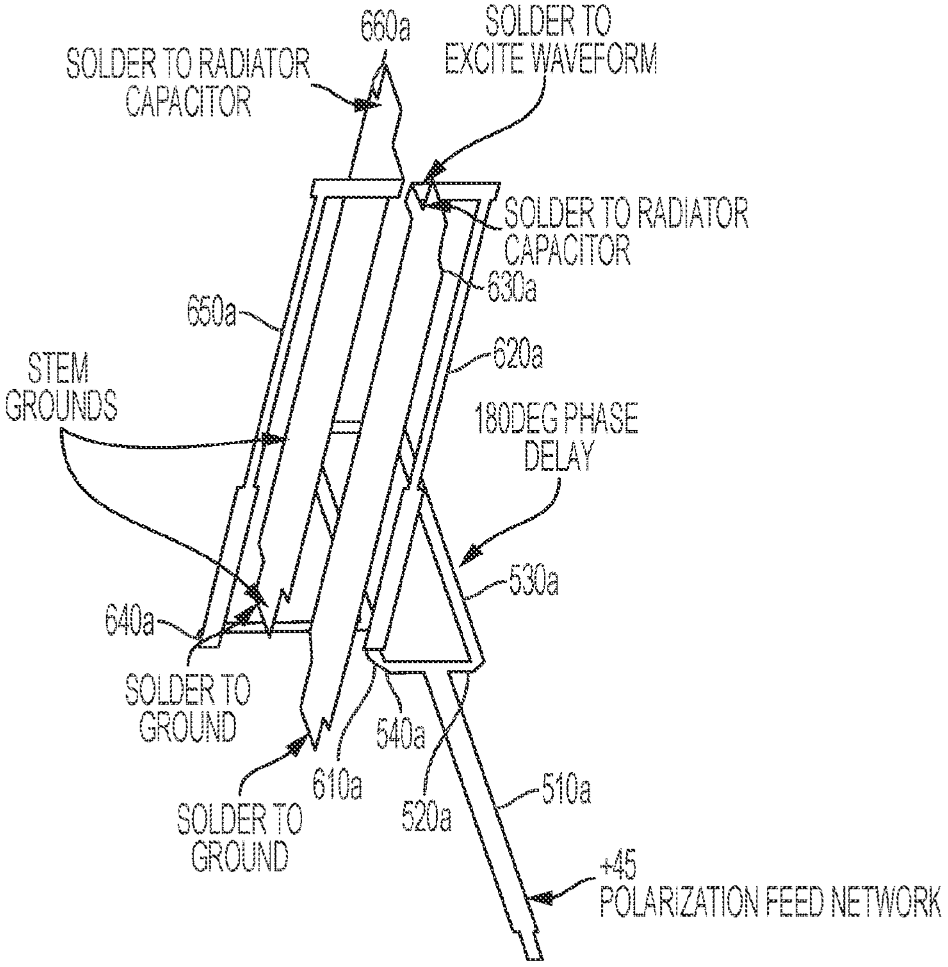
FIG. 7*a* is a different perspective view of the feedlines and balun circuit for the +450 polarization LB dipole component.

FIG. 7*a* illustrates a portion of the feedline 510*a*, power divider 520*a*, first and second traces 540*a* and 530*a*, microstrip baluns 620*a* and 650*a*, and microstrip ground plates 630*a* and 660*a* of the +45° polarization component of the system, with the stem plates removed from view. This drawing is provided to better illustrate the physical structure of the microstrip baluns 620*a*/650*a* and microstrip ground plates 630*a*/660*a*.

Figure 7B:
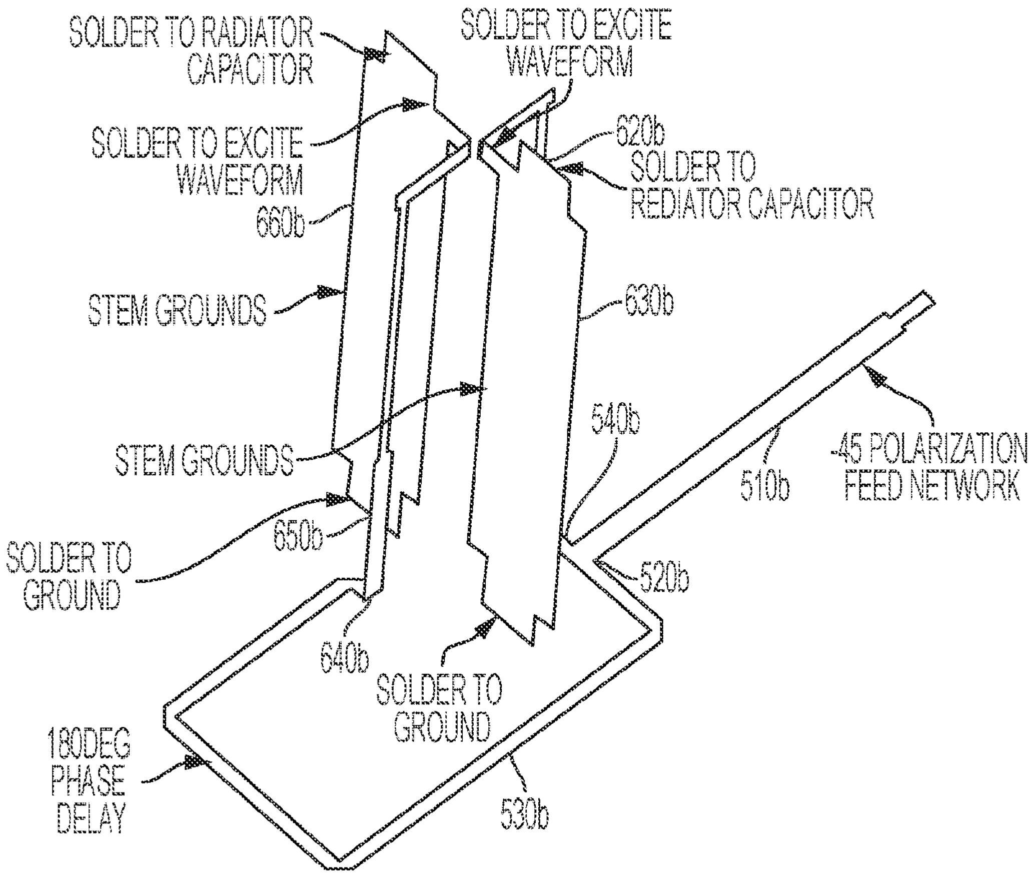
FIG. 7*b* is a different perspective view of the feedlines and balun circuit for the −45° polarization LB dipole component.

FIG. 7*b* provides a similar view of feedline 510*b*, power divider 520*b*, first and second traces 540*b* and 530*b*, microstrip baluns 620*b* and 650*b*, and microstrip ground plates 630*b* and 660*b*.

Figure 8:
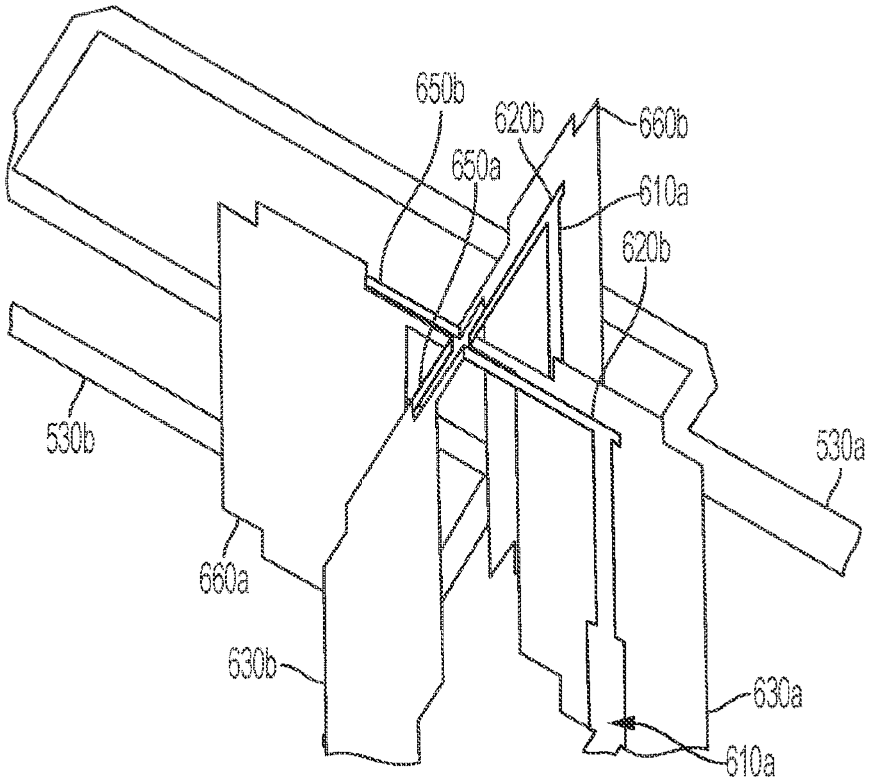
FIG. 8 illustrates the balun circuitry for both the +45° and −45° polarization components of the LB dipole, with the dipole stem plates removed from a view.
Figure 9:
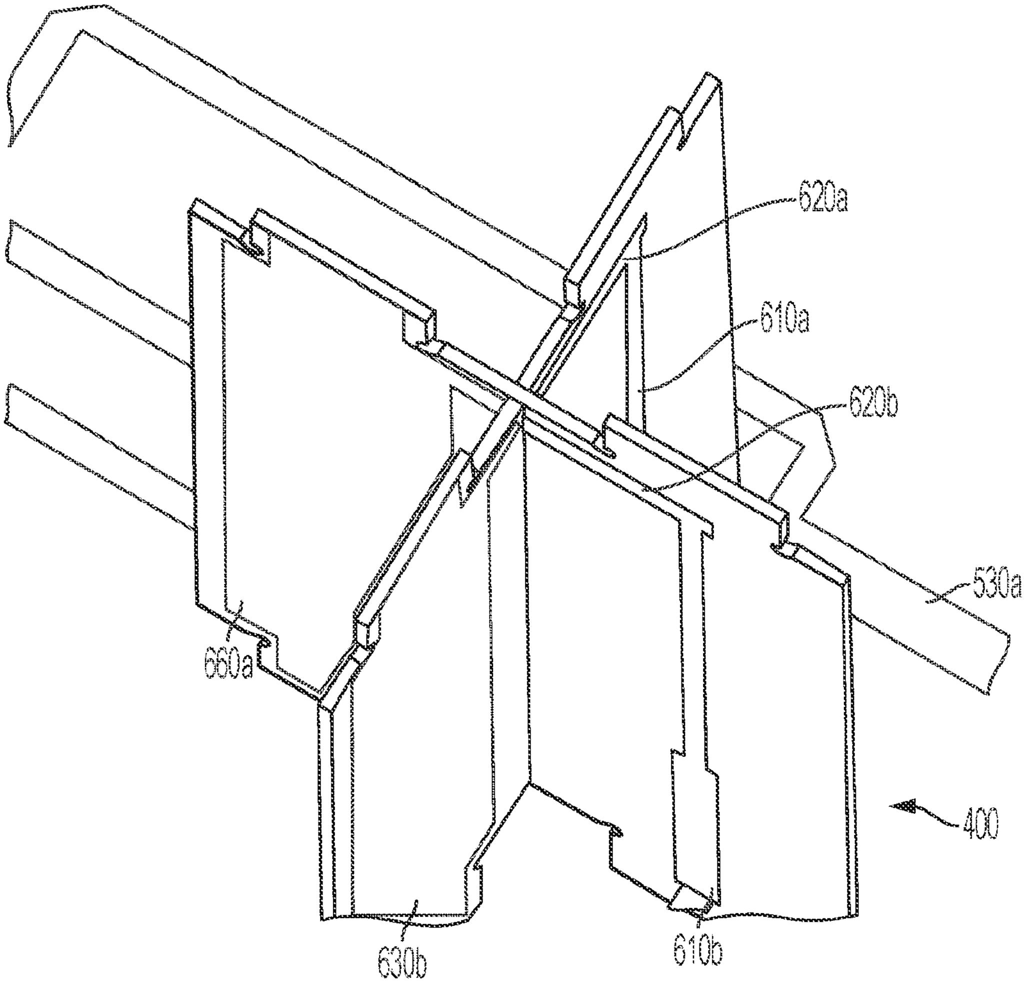
FIG. 9 illustrates the balun circuitry of FIG. 8, but with the dipole stem plates in view.

FIG. 8 provides a closer view of the combined drawings of FIGS. 7*a* and 7*b*, illustrating the respective connections between and relative orientations of microstrip baluns 620*a*/650*a* and microstrip ground plates 630*a*/660*a* (+45°) and the respective connections between and relative orientations of microstrip baluns 620*b*/650*b* and microstrip ground plates 630*b*/660*b* (−45°). FIG. 9 provides a similar view to that of FIG. 8, but with the stem plates present.

LB dipole 210 as described above may be operated in a circular polarization mode without modification to the components. To do this, instead of two separate RF signals being respectively assigned to the +45° and −45° signal paths, one may apply a single RF signal whereby, for example, the RF signal may be applied to −45° signal feedline 510*a*, and the same RF signal, offset by a +90° phase delay, may be applied to 45° signal feedline 510*b* In doing so, dipole arms 310*a*, 320*b*, 310*b*, 320*a* will radiate the same RF signal, each with a 90° phase rotation between them, resulting in a left hand circular polarization RF propagation from LB dipole 210. Alternatively, applying an RF signal to the +45° signal path, and the same RF signal with a −90° phase delay, results in a right hand circular polarized propagation, in which dipole arms 311*a*, 320*a*, 310*b*, and 320*b* radiate the same RF signal, each with a 90° phase rotation between them, generate a right hand circular RF propagation from LB dipole 210.

Figure 10A:
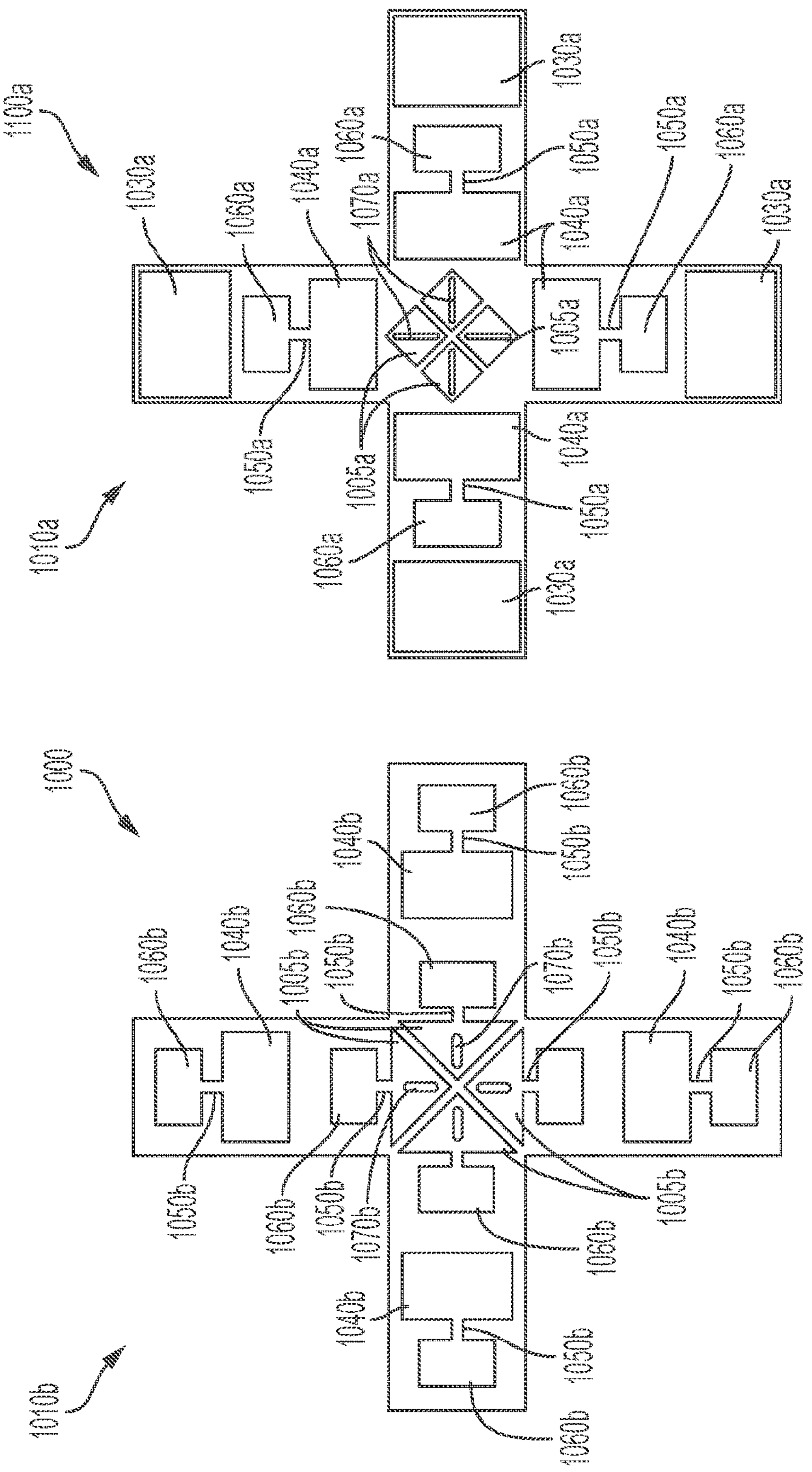
FIG. 10*a* illustrates the top and bottom sides of an additional exemplary LB dipole.

FIG. 10*a* illustrates an additional exemplary LB dipole 1000 according to the disclosure. LB dipole 1000 has a top side 1010*a* and a bottom side 1010*b*. Top side 1010*a* includes, at its center, four solder pads 1005*a*, each having a via 1070*a* through which a balun stem with a microstrip ground plate (not shown) are disposed so that the microstrip plate can be soldered to its respective solder pad 1005*a*. As illustrated, four dipole arms extend out from the center, on which are disposed a conductive element 1040*a*, an outward facing inductor trace 1050*a* that is coupled to a rectangular capacitive element 1060*a*. Further in the outward direction of each LB dipole arm is a distal conductive element 1030*a*, which may be substantially similar to conductive element 1040*a*.

Further illustrated in FIG. 10*a* is LB bottom side 1010*b*. Disposed in the center of LB bottom side 1010*b* are four arrowhead conductive elements 1005*b*, within which is disposed via 1070*b* through which a respective balun stem and microstrip plate (not shown) are disposed. Each arrowhead conductive element 1005*b* is coupled to an inductor trace 1050*b*, which is further coupled to a rectangular capacitive element 1060*b*. Disposed further outward on each LB dipole arm is a conductive element 1040*b*, each of which is coupled to an inductor trace 1050*b* and further coupled to a rectangular capacitive element 1060*b*.

Figure 10B:
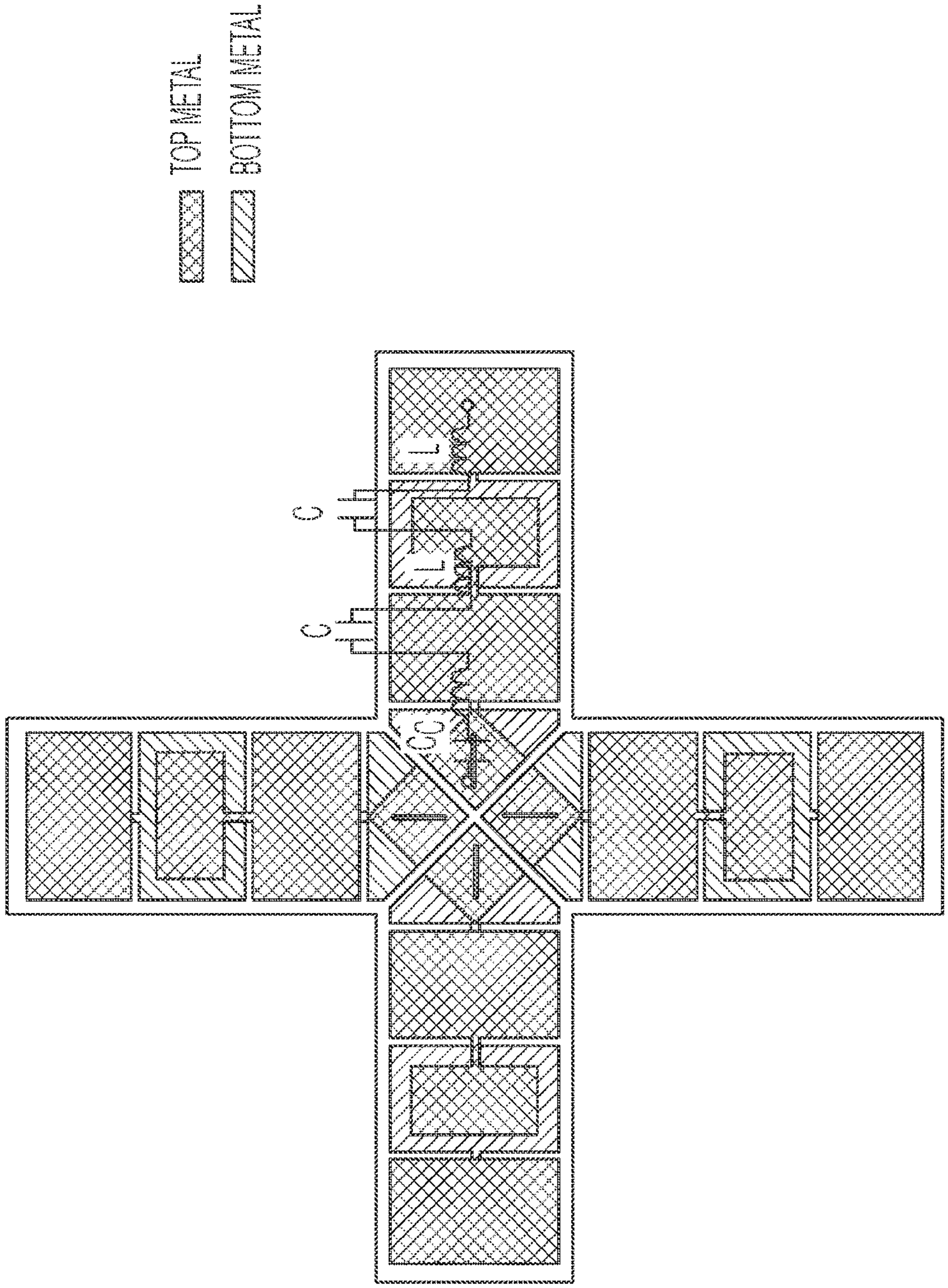
FIG. 10*b* illustrates the exemplary LB dipole of FIG. 10*a*, along with a depiction of the capacitive and inductive structures embedded within the dipole structure

FIG. 10*b* illustrates LB dipole 1000 along with a depiction of the inductors and capacitors that are formed by the elements on its top side 1010*a* and bottom side 1010*b*. As with the example illustrated in FIG. 4, the conductive elements 1040*a/b* and 1030*a* are each disposed opposite a rectangular conductive element 1060*a/b* whereby each LB dipole arm comprises a series of inductors and capacitors whereby the capacitors are formed by the LB dipole arm PCB substrate with the conductive elements and capacitive elements on opposite sides thereof. The series of inductors and capacitors are tuned such that the LB dipole 1000 radiate in the low band frequencies and are effectively short circuited at high band frequencies.

Figure 11:
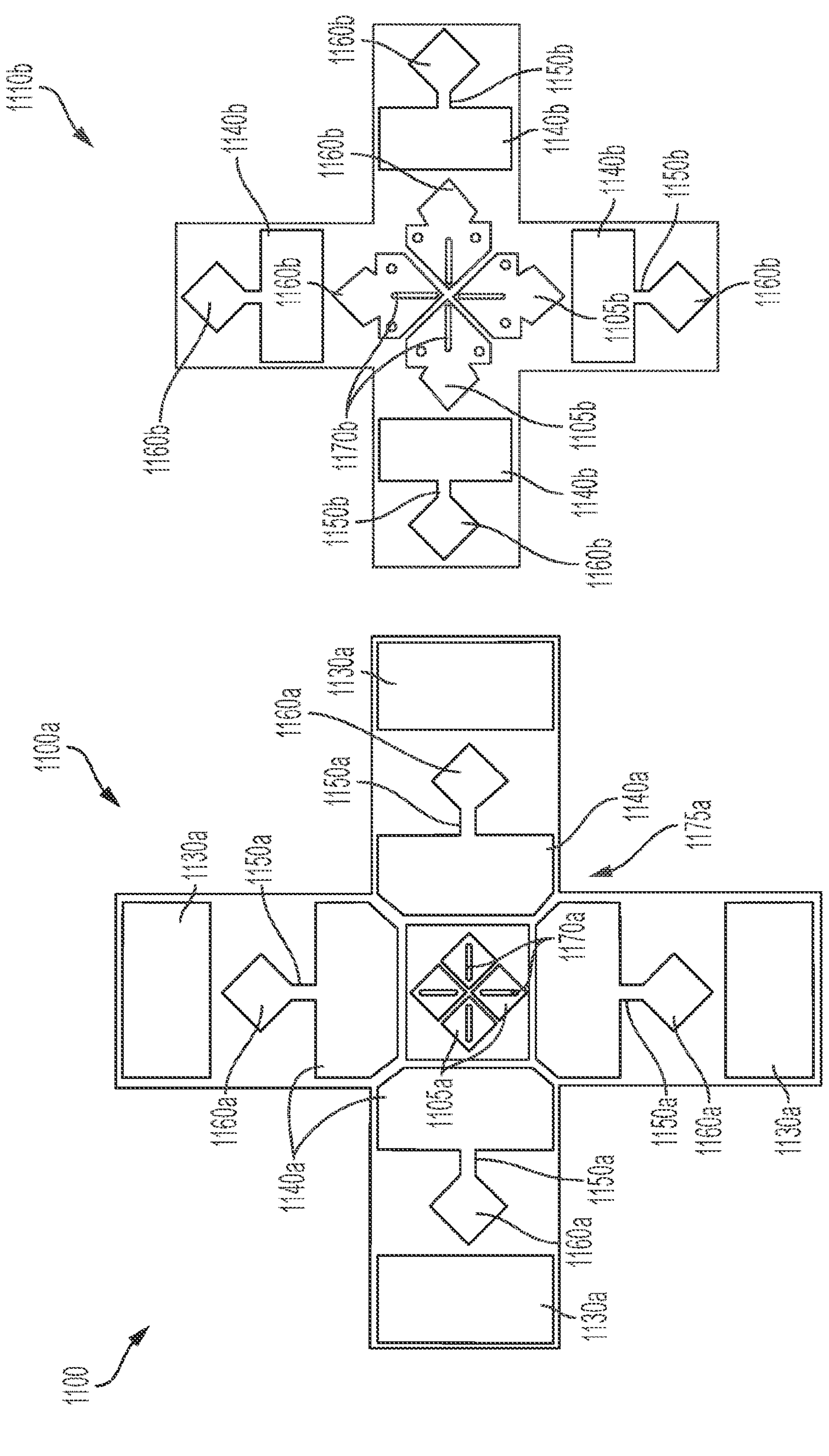
FIG. 11 illustrates the top and bottom sides of another exemplary LB dipole, having a reduced LB dipole span.

FIG. 11 illustrates another exemplary LB dipole 1100 according to the disclosure. An advantage of LB dipole 1100 is that its dipole arm span is shorter than LB dipole 1000, which reduces the interference or shadowing of the HB radiation patterns of HB dipoles 110. In order to preserve bandwidth, given the shorter arm span, each arm is wider than for LB dipole 1000. FIG. 11 provides exemplary dimensions of 177 mm for the length of a given dipole arm of LB dipole 1100, and 48.5 mm for the width. It will be understood that these dimensions am examples and that variations to these dimensions are possible and within the scope of the disclosure.

LB dipole 1100 has a top side 1110*a* and a bottom side 1110*b*. Top side 1110*a* has, at its center, four solder pads 1105*a*, each having a respective via 1170*a* through which a balun stem with a microstrip ground plate (not shown) are disposed so that the microstrip plate can be soldered to its respective solder pad 1105*a*. As illustrated, four dipole arms extend out from the center, on which am disposed a conductive element 1140*a*, an outward facing inductor trace 1150*a* that is coupled to a rectangular capacitive element 11603. Further in the outward direction of each LB dipole arm is a distal conductive element 1130W, which may be substantially similar to conductive element 1140*a* Top side 1110*a* also has a gap 1175*a* disposed between conductive elements 1140*a*. Gap 1175*a* may have a width of about 1 mm.

Further illustrated in FIG. 11 is LB bottom side 1110*b*. Disposed in the center of LB bottom side 1110*b* are four arrowhead conductive elements 1105*b*, within which is disposed via 1170*b* through which a respective balun stem and microstrip plate (not shown) are disposed. Each arrowhead conductive element 1105*b* has a portion of a "diamond" shaped capacitive element 1160*b*. Disposed further outward on each LB dipole arm is a conductive element 1140*b*, each of which is coupled to an inductor trace 1150*b* and further coupled to a diamond shaped capacitive element 1160*b*. The arrangement of a series of capacitors and inductors created by the structure of LB dipole 1100 is similar to that of LB dipole 1000 except for the partial diamond capacitive element 1160 on LB dipole 1100 and the gaps 1175*a* between adjacent conductive elements 1100*a*.

Figure 12:
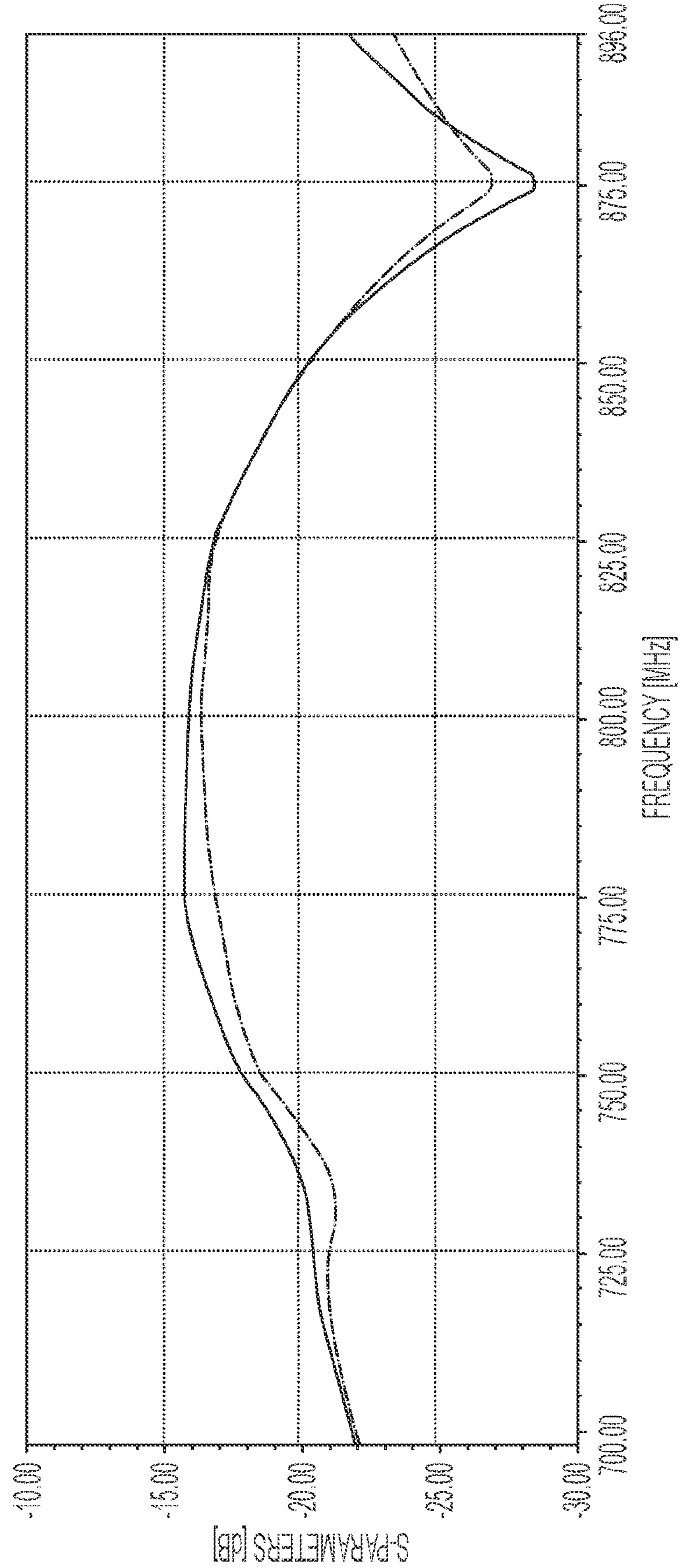
FIG. 12 plots S-parameter performance of the LB dipole illustrated in FIG. 11.

FIG. 12 plots the S-parameter performance of the exemplary LB dipole 1100.

It will be understood that either of LB dipole 1000 and LB dipole 1010 may be used with the balun and feed network described above, in place of LB dipole 210. This includes the circular polarization function described above and the 45 degree polarization tilting function described above with respect to FIG. 6*c*.

Further variations to the invention are possible and within the scope of the disclosure. For example, the disclosed structure of LB dipoles 210, 1000, and 1100 may be used independently of the disclosed phase rotating feed network and balun circuitry. In such an example, the disclosed LB dipole 210/1000/1100 could be used with the antenna array face 100, in which case the feed network and balun circuitry may be of a conventional variety due to the fact that the radiated +/−45° polarized RF propagation is parallel to each of the dipole arms. Further, other LB dipole structures may be used with the disclosed phase rotating feed network and balun circuitry. In this case, the substantial similarity between any alternative LB dipole and the disclosed LB dipoles include a cross-shaped arrangement of individual radiators, each of which is independently fed.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments but should be defined only in accordance with the following claims and their equivalents.

What is claimed is:

1. A dipole having four dipoles arranged in a cross configuration, comprising:

a first conductive pattern formed on a first side of a PCB (Printed Circuit Board), the first conductive pattern having a first conductive element;

a second conductive pattern formed on a second side of the PCB, the second conductive pattern having a second conductive element, a second inductive trace, and a second capacitive element, wherein the first conductive element is disposed opposite the second capacitive element on the PCB;

a third conductive pattern formed on the first side of the PCB, the third conductive pattern having a third conductive element, a third inductive trace, and a third capacitive element, wherein the third capacitive element is disposed opposite the second conductive element on the PCB; and a fourth conductive pattern formed on the second side of the PCB, the fourth conductive pattern having an arrow-shaped conductive element, a fourth inductive trace, and a fourth capacitive element, wherein the fourth inductive trace is disposed opposite the third conductive element on the PCB.

2. The dipole of claim 1, wherein the second capacitive element, the third capacitive element, and the fourth capacitive element each have a diamond shape.

3. The dipole of claim 2, wherein the first conductive element, the second conductive element, and the third conductive element each have a rectangular shape.

4. The dipole of claim 1, further comprising four solder pads disposed on the first side of the PCB, wherein each of the four solder pads is disposed opposite a corresponding arrow-shaped conductive element on the PCB.

5. The dipole of claim 4, wherein each arrow-shaped conductive element comprises a via, wherein the via is formed in the arrow-shaped conductive element, the PCB, and the corresponding solder pad.

* * * * *